UNITED STATES PATENT OFFICE.

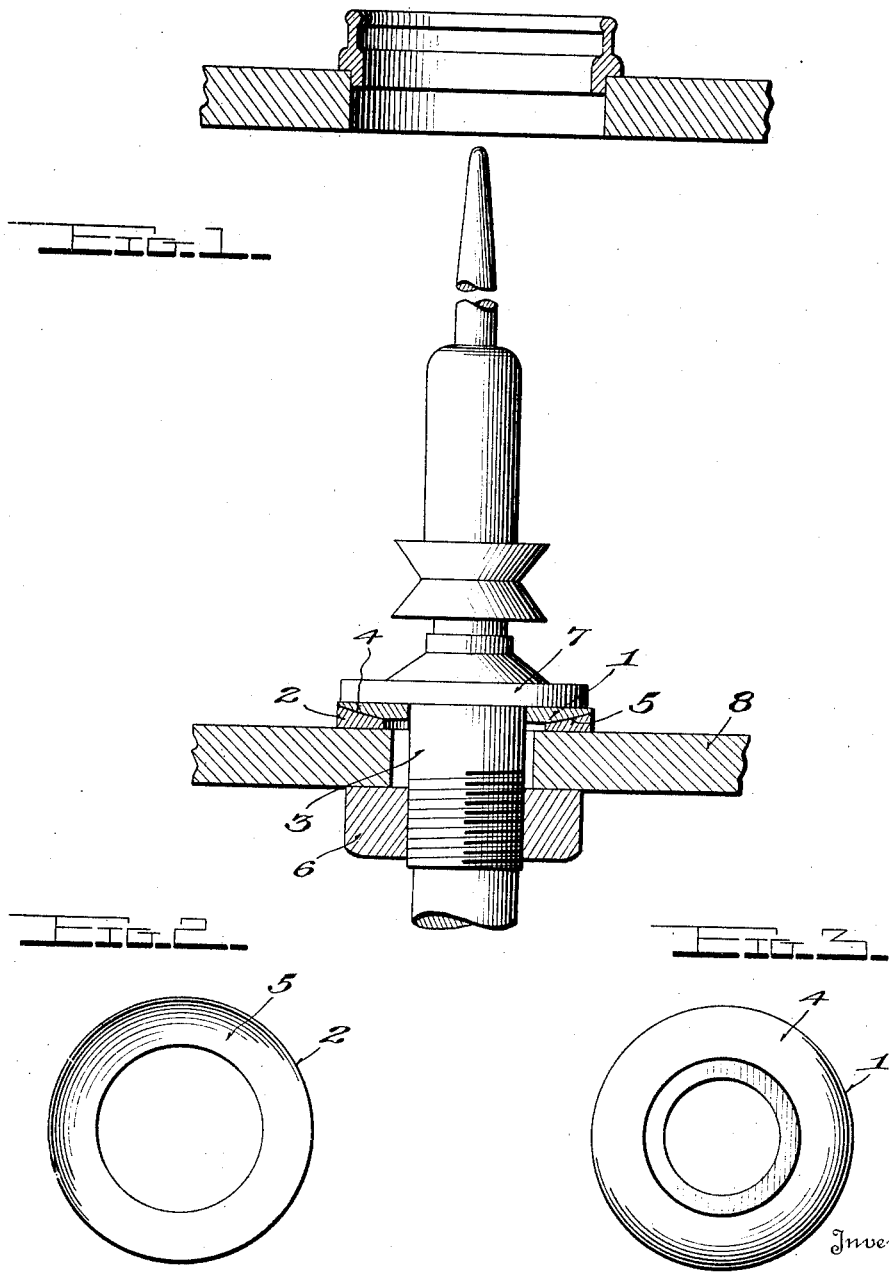

PAUL LEVASSEUR, OF FALL RIVER, MASSACHUSETTS.

SPINDLE-MOUNTING.

1,382,990.  Specification of Letters Patent.  Patented June 28, 1921.

Application filed July 10, 1920. Serial No. 395,349.

*To all whom it may concern:*

Be it known that I, PAUL LEVASSEUR, a citizen of the United States, residing at Fall River, in the county of Bristol and State of Massachusetts, have invented new and useful Improvements in Spindle-Mountings, of which the following is a specification.

This invention relates to certain new and useful improvements in spindle mountings and pertains more especially to the mounting of spindles in spinning machines.

The primary object of the invention is to provide a mounting which consists of but two parts, namely a male and a female member, each contacting throughout 360°, so as to provide for the disposition of the spindle in perfect plumb alinement causing same to run with a uniform bearing in the bolster case.

A further object of the invention is to provide a simple and economical construction of mounting which consists of but two ring-like parts which internest and which can be easily and quickly adjusted.

The invention further resides in the construction and combination of parts hereinafter described and pointed out in the claims.

In the drawings:

Figure 1, is a vertical sectional view, partly in side elevation, of the invention;

Fig. 2 is a plan view of the female member, and

Fig. 3 is a similar view of the male member.

In proceeding in accordance with the present invention, a male member 1, is employed consisting of a ring-like structure having its under face beveled at 4 from its periphery downwardly and inwardly. The male member is formed with its opening of a diameter so as to fit the stem 2 of the spindle, as depicted in Fig. 1, of the drawings. The female member 5 has a flat bottom which seats firmly on the rail also as depicted in Fig. 1, while its upper face is beveled at 5, to correspond to the bevel of the male member 1, the bevel of the female member being downwardly and inwardly from its periphery. As shown in the drawings the opening of the female member is considerably larger than that of the male member, which is for the purpose of adjustment as will be now described.

The nut 6 is first loosened to adjust the parts whereupon the female member is moved in the required direction to cause the spindle to have a true vertical disposition, or, in other words, to cause the flat upper face of the male member to lie in a true horizontal plane, since it is upon the upper face of the male member that the base 7, of the spindle structure engages and is held against. The nut is then tightened so as to be impinged against the rail 8, in which position the parts will be rigidly held. Due to the opening of the female member being larger than that of the stem 3, it will be apparent that a wide latitude of adjustment of the female member is permitted. Further, the male member has its bevel as above stated conforming to that of the female member, consequently when the parts are adjusted and the nut tightened the two members will not shift but will retain their adjusted positions in which they are normally held until the nut exerts sufficient gripping action to retain the parts against movement.

It will thus be seen that a simple and easily operated structure is provided, and one which can be economically produced due to both parts being of ring-like formation, and each possessed of the same inclined seat formation.

Further, the members have a somewhat rolling contact, and due to the beveled seats a cam-like action is had through which the upper member is adjusted by the action of the lower member.

Having thus described my invention, what I claim as new and desire to secure by Letters Patent is:—

1. In a combination with a rail, and a spindle having a base and a stem depending therefrom, a male and a female member each of ring-like shape and formed independent of the spindle and one another, said members having interengaging inner beveled faces and having their outer faces interposed between the base and the rail, respectively, so that the base rests upon and is supported by the two members, and means to draw the stem downwardly to thereby cause the base to exert holding action on the two members.

2. In combination with a rail, and a spindle having a base and a stem depending therefrom, a male and a female member each of ring-like shape and formed independent of the spindle and one another, said members having interengaging inner beveled faces and having their outer faces interposed between the base and the rail, respectively, so that the base rests upon and is supported by the two members, and means to draw the stem downwardly to thereby cause the base to exert holding action on the two members, one of the members closely engaging about the stem so as to partake of all lateral movements thereof and the other member having an opening considerably larger than the diameter of the stem.

In testimony whereof I have signed my name to this specification in the presence of two subscribing witnesses.

PAUL LEVASSEUR.

Witnesses:
E. P. TOOMEY,
J. A. MILLER.